United States Patent [19]

Crouse et al.

[11] Patent Number: 4,832,735

[45] Date of Patent: May 23, 1989

[54] HIGH NUTRIENT VALUE LIQUID FERTILIZER

[75] Inventors: Walter C. Crouse, Wise, Va.; Owen M. McIntyre, Caledonia, Ohio

[73] Assignee: Na-Churs Plant Food Company, Marion, Ohio

[21] Appl. No.: 183,328

[22] Filed: Apr. 7, 1988

Related U.S. Application Data

[63] Continuation of Ser. No. 815,215, Dec. 31, 1985, abandoned.

[51] Int. Cl.$^4$ .............................................. C05B 7/00
[52] U.S. Cl. .......................................... 71/36; 71/41; 71/64.10
[58] Field of Search ............... 71/1, 31, 33, 34, 36, 71/41–43, 64.10; 423/308–313

[56] References Cited

U.S. PATENT DOCUMENTS

| | | | |
|---|---|---|---|
| 2,770,538 | 11/1956 | Vierling | 71/29 |
| 2,869,996 | 1/1959 | Vierling | 71/29 |
| 2,869,998 | 1/1959 | Vierling | 71/50 |
| 2,950,961 | 8/1960 | Striplin, Jr. et al. | 71/42 |
| 3,024,099 | 3/1962 | Martinson | 71/34 |
| 3,183,073 | 5/1965 | Preston | 71/1 |
| 3,347,656 | 10/1967 | Potts et al. | 71/36 |
| 3,711,269 | 1/1973 | Curless | 71/36 |
| 4,315,763 | 2/1982 | Stoller et al. | 71/29 |

OTHER PUBLICATIONS

Liquid Fertilizer Manual, NFSA, 1967, pp. 17-6, (18-4-)-(18-10).

Liquid Fertilizers from Superphosphoric Acid, Striplin 6-11-59, Proc. of Liq. Fert. Conference, Kirk-Othmer, Encyc. of Chem. Tech, pp. 98–105, vol. 10.

*Primary Examiner*—Ferris H. Lander
*Attorney, Agent, or Firm*—Guy W. Shoup; Paul J. Winters; Stephen L. Malaska

[57] ABSTRACT

A liquid fertilizer containing about 6% to 9% nitrogen (N), 24% to 30% phosphoruspentoxide ($P_2O_5$), and 5% to 9% potassium oxide ($K_2O$). The fertilizer is produced by the reaction of ammonium phosphate solution with phosphoric acid and a potassium-containing compound, such as potassium hydroxide.

6 Claims, No Drawings

HIGH NUTRIENT VALUE LIQUID FERTILIZER

This is a continuation application from application Ser. No. 815,215, filed Dec. 31, 1985, now abandoned.

BACKGROUND AND BRIEF DESCRIPTION OF THE INVENTION

This invention relates to liquid fertilizers, and more particularly to a liquid fertilizer of high nutrient value containing above about 35% by weight of the essential nutrients, and preferably above about 40% by weight of such nutrients: nitrogen (N), phosphorus (expressed in terms of phosphoruspentoxide-$P_2O_5$), and potassium (expressed in terms of potassium oxide-$K_2O$).

Heretofore, a completely liquid fertilizer, free of precipitates, of relatively high nutrient value and containing all essential nutrients (nitrogen, phosphorus, and potassium) has been difficult to produce. U.S. Pat. Nos. 2,770,538 and 2,869,996 to Vierling are representative and disclose the mixing together of potassium hydroxide and phosphoric acid with ammonia, and possibly urea to produce a fertilizer having the claimed nutrient value: 10% N, 20% $P_2O_5$, and 10% $K_2O$. The Vierling processes involve use of the essentially unstable ammonia, either in gaseous form or aqueous ammonia solution. U.S. Patent to Vierling U.S. Pat. No. 2,869,998 is similar, involving the further component nitric acid; in this case, a relatively low nutrient value product (8% N, 8% $P_2O_5$, and 8% $K_2O$) is produced. U.S. Pat. No. 3,183,073 to Preston discloses a high nutrient value liquid fertilizer produced by use of a superacid (highly concentrated phosphoric acid and sucrose), together with ammonia and potassium hydroxide. U.S. Pat. No. 3,711,269 to Curless discloses a process for manufacturing liquid fertilizer utilizing potassium phosphate, phosphoric acid, and ammonia. In this case, the separation of precipitated solids and ammonia is required. U.S. Pat. No. 3,347,656 to Potts et al discloses a liquid fertilizer produced from potassium chloride, phosphoric acid, and ammonia, containing all three essential nutrients ranging from 10% to 60% by weight of the total product. U.S. Pat. No. 3,024,099 to Martinson disclosed a liquid fertilizer utilizing a fluosilicate. U.S. Pat. No. 2,950,961 to Striplin et al discloses a liquid fertilizer produced from ammonia, superphosphoric acid, potash salts. Liquid fertilizers from superphosphoric acids are discussed in Tennessee Valley Authority, Division of Chemical Development, "Proceedings of the Liquid Fertilizer Conference," 11 June 1959, by M. M. Striplin, Jr. The "Encyclopedia of Chemical Technology," third edition, volume 10, published by John Wiley & Sons, pages 98 to 105, contains a discussion of liquid mixed fertilizers.

In none of the above references is there disclosed a high nutrient value liquid fertilizer containing between about 6% to 9% N, 24% to 30% $P_2O_5$, and 5% to 9% $K_2O$, which is produced by the use of reasonably stable component materials which are admixed together, as in the present invention. The present invention involves the reaction of ammonium phosphate solution, preferably containing polyphosphate and orthophosphate components, with phosphoric acid and a potassium-containing compound, such as potassium hydroxide, to produce such a high nutrient value liquid fertilizer which is stable over a wide range of temperatures and in which salts in solution do not precipitate out.

The invention will be more completely understood by reference to the following detailed description of a presently preferred embodiment.

DETAILED DESCRIPTION

Preferably ammonium polyphosphate solution (10-34-0), commercially available, is utilized in the production of a liquid fertilizer in accordance with the present invention. Such ammonium polyphosphate solution contains about 10% N and 34% $P_2O_5$ by weight. The $P_2O_5$ component in turn is composed of from 30% to 45% orthophosphate $(H_2PO_4)-$ and from 55% to 70% polyphosphate $(H_2PO_4-HPO_{3n}-1)$. To produce 100 pounds of liquid fertilizer in accordance with the present invention, 70 pounds (5.94 gallons) of the ammonium polyphosphate solution (10-34-0) may be combined in a stainless steel reactor with 3.95 pounds (0.47 gallon) of water. Preferably the water and ammonium polyphosphate solutions are added to the container simultaneously. Following the addition of these materials to the container and their mixing therein, 75% technical furnace grade phosphoric acid (75% $H_3PO_4$) is added to the container, preferably introduced into the solution already in the container below the surface of that solution. 45% chemical grade aqueous potassium hydroxide (45% KOH) is also added to the mixture in the container, preferably below the surface thereof. A total of 7.72 pounds (0.59 gallon) of the phosphoric acid and 18.33 pounds (1.50 gallons) of potassium hydroxide are added, to provide a total constituent weight of 100 pounds (8.50 gallons) of produced liquid fertilizer solution. In the adding of the phosphoric acid and potassium hydroxide, the rate of addition is adjusted to maintain a slightly acidic medium (pH maintained between about 6 and 8) throughout the production process. This is preferably achieved by first adding an amount of phosphoric acid, followed by the addition of potassium hydroxide, followed by more phosphoric acid and more potassium hydroxide, in that order, so as to maintain slight acidity in the solution. By retaining the solution slightly acidic, the production of ammonia gas is minimized. It has been found, however, that some ammonia gas is produced, and hence it may be advantageous to spray the vent stack from the container with jets of water to return the ammonia gas into solution.

The above process is carried out at room temperature, and the temperature of the solution reaches approximately 130% F. After the addition of all constituent materials, the solution is cooled to 90% by processing it through a heat exchanger, and the production of the liquid fertilizer is completed.

A greenish, transluscent concentrated liquid fertilizer solution is produced weighing about 11.76 pounds per gallon and having a pH between about 6.5 and 7.5. The salts in the solution remain within solution over a wide range of temperatures and do not precipitate out. Thus the product exhibits long shelf life, and is extremely stable. An analysis of the product produced by the above process shows that it is a true liquid fertilizer characterized as 7-28-7, i.e., 7% N, 28% $P_2O_5$, and 7% $K_2O$, by weight. This true liquid fertilizer thus has a nutrient value of 42% by weight.

The fertilizer produced in accordance with the present invention has wide agricultural and horticultural use in connection of the fertilization of corn, beans, and similar plants. Typically, the fertilizer is used as a starter fertilizer which is broadcast or banded alongside rather than in a trench containing seed. The application rate is probably between 3 to 15 or 20 gallons per acre as a starter fertilizer.

The above is a presently preferred liquid fertilizer formulation. While constituents for 8.50 gallons of fertilizer have been given, the formulation may be used to manufacture a batch with a final volume of anywhere from 1 gallon (a practical minimum) to over 5,000 gallons. While a fertilizer analyzing at 7-28-7 is produced, variations in constituents may provide for a range in the nutrient values of from 6% to 9% N, 25% to 30% $P_2O_5$, and 4% to 9% $K_2O$. The nutrients in the liquid fertilizer produced are in the form of dihydrogen phosphate ions ($H_2PO_4-$) and hydrogen phosphate ions ($HPO_4{}^{2-}$), as well as various forms of the polyphosphate ions, potassium ions ($K+$), and ammonium ions ($NH_4+$). The ions are free to interact individually as ion pairs. In the fertilizer solution itself, the nutrients exist in the form of complex ion pairs. The chemical equation governing the production of the liquid fertilizer in accordance with the present invention is believed to be the following:

$$H_2O + KOH + H_3PO_4 +$$

$$NH_{4\ O-n+2}(P_nO_{3n+1}H_n + 2) \xrightarrow{\mp O\ -\ n\ +\ 2}$$

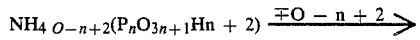
$$K^+ + NH_4{}^+(P_nO_{3n+1}H_{O-n+2})-O - n + 2$$

While the invention has been described above in terms of a presently preferred embodiment thereof, it will be understood by those skilled in the art that modifications may be made. For example, 75% wet processed phosphoric acid (green acid) may be substituted for the 75% technical furnace grade phosphoric acid noted above in connection with the presently preferred embodiment of this invention. By such substitution, the shelf life of the resultant liquid fertilizer may be reduced. Other forms of phosphoric acid may be employed. Further, 62% white crystalline potassium chloride (KCl) may be substituted for the potassium hydroxide. Again, the substitution may lessen shelf life of the resultant liquid fertilizer product, and the rust characteristic of the fertilizer may be increased due to the presence of chloride ions.

Still further, to change nitrogen content, urea might be added, or the ammonium phosphate solution might be varied (e.g., use of 11-33-0 or 11-37-0). The $K_2O$ content of the resultant fertilizer could be adjusted by suitable variation of phosphoric acid and/or potassium hydroxide. The $P_2O_5$ content might be changed by suitable variation of phosphoric acid.

As to the mechanism by which the present invention is effective, it is possible that the orthophosphate in the ammonium polyphosphate solution is neutralizing the potassium hydroxide. Another alternative is that the polyphosphate bonds are being hydrolized to some extent and are also reacting with the potassium hydroxide to produce the near neutral pH solution.

Accordingly, the invention should be taken to be defined by the following claims.

We claim:

1. A method for producing a high nutrient value, clear aqueous liquid solution fertilizer containing three essential nutrients N, $P_2O_5$, and $K_2O$, comprising the steps of:
   mixing in a container an ammonium polyphosphate solution and water,
   alternately adding technical phosphoric acid and a potassium-containing compound in respective incremental amounts, first the acid then the base, in order to control the reaction in the mixture to maintain a liquid medium of about 6-8 pH,
   carrying out said mixing and adding of starting materials at substantially ambient temperature and pressure, and
   selecting suitable proportions of said starting materials, and carrying out said mixing and adding steps such that the resultant fertilizer solution is comprised of water and about 42% by weight of total nutrients in the following percentages by weight of constituents, wherein said total weight of nutrients remains stably dissolved in said clear aqueous liquid solution:
   7% nitrogen (N),
   28% phosphorus pentoxide ($P_2O_5$), and
   7% potassium oxide ($K_2O$).

2. A method for producing a liquid solution fertilizer according to claim 1, in which said ammonium polyphosphate solution comprises between about 70% to 55% polyphosphate and between about 30% to 45% of orthophosphate by weight of the total phosphate in said ammonium phosphate solution.

3. A method for producing a liquid solution fertilizer according to claim 2, in which said ammonium phosphate solution is constituted by about 10% to 11% nitrogen and 34% to 37% $P_2O_5$.

4. A method for producing a liquid solution fertilizer according to claim 1, in which said potassium-containing compound comprises potassium hydroxide.

5. A method for producing a liquid solution fertilizer according to claim 1, in which said potassium-containing compound comprises potassium chloride.

6. A clear aqueous liquid fertilizer solution having a total nutrient composition of approximately 42% by weight, a pH of approximately 6-8, comprising:
   water;
   and approximately the following weight percentages of nutrients N, $P_2O_5$, and $K_2O$:
   7% Nitrogen (N),
   28% Phosphorous Pentoxide ($P_2O_5$), and
   7% Potassium Oxide ($K_2O$);
   wherein the total nutrient composition has a weight ratio of approximately 1:4:1, respectively, and remains stably dissolved in said clear aqueous liquid solution.

* * * * *

UNITED STATES PATENT AND TRADEMARK OFFICE
CERTIFICATE OF CORRECTION

PATENT NO. : 4,832,735
DATED : May 23, 1989
INVENTOR(S) : Walter C. Crouse, et al It is certified that error appears in the above-identified patent and that said Letters Patent is hereby corrected as shown below:

Correct the title to read --HIGH NUTRIENT VALUE LIQUID SOLUTION FERTILIZER--.

Claim 1: Col. 4, line 12 should read --alternately adding 75% technical furnace grade phosphoric acid and a--.

Claim 6: Col. 4, line 47, after "solution" insert --wherein the starting materials comprise ammonium phosphate solution, preferably containing polyphosphate and orthophosphate components, phosphoric acid and a potassium containing compound,--.

Signed and Sealed this

Thirteenth Day of March, 1990

Attest:

JEFFREY M. SAMUELS

Attesting Officer

Acting Commissioner of Patents and Trademarks

UNITED STATES PATENT AND TRADEMARK OFFICE
CERTIFICATE OF CORRECTION

PATENT NO. : 4,832,735
DATED : May 23, 1989
INVENTOR(S) : Walter C. Crouse, Owen M. McIntyre It is certified that error appears in the above-identified patent and that said Letters Patent is hereby corrected as shown below:

Col. 2, line 48, "130%F" should be --130°F--;
Col. 2, line 49, "90%" should be --90°F--.

Signed and Sealed this

Eleventh Day of December, 1990

Attest:

HARRY F. MANBECK, JR.

*Attesting Officer*     *Commissioner of Patents and Trademarks*